US011334390B2

(12) United States Patent
Fang et al.

(10) Patent No.: US 11,334,390 B2
(45) Date of Patent: May 17, 2022

(54) HYPER-CONVERGED INFRASTRUCTURE (HCI) RESOURCE RESERVATION SYSTEM

(71) Applicant: Dell Products L.P., Round Rock, TX (US)

(72) Inventors: Yung-Chin Fang, Austin, TX (US); Jingjuan Gong, Westborough, MA (US); Xiaoye Jiang, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 16/457,376

(22) Filed: Jun. 28, 2019

(65) Prior Publication Data

US 2020/0409766 A1 Dec. 31, 2020

(51) Int. Cl.
G06F 9/46 (2006.01)
G06F 9/50 (2006.01)
G06F 13/40 (2006.01)

(52) U.S. Cl.
CPC ............ G06F 9/5061 (2013.01); G06F 9/505 (2013.01); G06F 9/5038 (2013.01); G06F 13/4022 (2013.01); *G06F 2209/5014* (2013.01); *G06F 2209/5021* (2013.01)

(58) Field of Classification Search
CPC .. G06F 9/5061; G06F 13/4022; G06F 9/5038; G06F 9/505; G06F 2209/5021; G06F 2209/5014
See application file for complete search history.

(56) References Cited

U.S. PATENT DOCUMENTS

| 7,027,418 | B2 | 4/2006 | Gan et al. | |
|---|---|---|---|---|
| 9,436,493 | B1* | 9/2016 | Thomas | G06F 21/6218 |
| 10,462,045 | B1* | 10/2019 | Francois | H04L 41/0668 |
| 11,134,013 | B1* | 9/2021 | Allen | H04L 67/1097 |
| 2002/0091746 | A1* | 7/2002 | Umberger | G06F 3/0659 |
| | | | | 718/105 |
| 2009/0119396 | A1 | 5/2009 | Kanda | |
| 2009/0235044 | A1* | 9/2009 | Kisel | G06F 3/0613 |
| | | | | 707/999.103 |
| 2011/0016214 | A1* | 1/2011 | Jackson | G06F 9/505 |
| | | | | 709/226 |
| 2013/0042064 | A1* | 2/2013 | Simionescu | G06F 12/0871 |
| | | | | 711/118 |

(Continued)

*Primary Examiner* — Adam Lee
(74) *Attorney, Agent, or Firm* — Joseph Mencher

(57) ABSTRACT

A resource reservation system includes a media module that includes a plurality of media devices and a media controller that is coupled to the plurality of media devices. The media controller retrieves media device attributes from each of the plurality of media devices that identify performance capabilities for each of the plurality of media devices and determines one or more media module partitions that are included in the media module. Each of the one or more media module partitions are provided by a subset of the plurality of media devices. The media controller then determines, for each of the media module partitions, a minimum partition performance for that media module partition based the media device attributes for the subset of the one or more media devices that provide that partition and provides the minimum partition performance for each of the media module partitions to a resource reservation device.

20 Claims, 11 Drawing Sheets

(56) References Cited

U.S. PATENT DOCUMENTS

| | | | |
|---|---|---|---|
| 2015/0160891 A1* | 6/2015 | Beeson | G06F 3/0613 |
| | | | 711/117 |
| 2017/0111268 A1* | 4/2017 | Swallow | H04L 45/00 |
| 2017/0289061 A1* | 10/2017 | Cudak | H04L 41/0896 |
| 2017/0324813 A1* | 11/2017 | Jain | G06F 9/5016 |
| 2018/0113640 A1* | 4/2018 | Fernandez | G06F 3/061 |
| 2018/0150244 A1* | 5/2018 | Caporale | G06F 3/0608 |
| 2018/0232142 A1* | 8/2018 | Shekar | G06F 12/0842 |
| 2018/0275728 A1* | 9/2018 | La Monica | G06F 1/206 |
| 2018/0307537 A1* | 10/2018 | Chen | G06F 9/45504 |
| 2018/0357107 A1* | 12/2018 | Devireddy | G06F 9/5077 |
| 2019/0012211 A1* | 1/2019 | Selvaraj | G06F 9/5055 |
| 2019/0079799 A1* | 3/2019 | Kumar | G06F 9/5044 |
| 2019/0250693 A1* | 8/2019 | Mizuno | G06F 1/3206 |
| 2019/0342380 A1* | 11/2019 | Thota | G06F 16/2322 |
| 2020/0004570 A1* | 1/2020 | Glade | G06F 9/45558 |
| 2020/0034270 A1* | 1/2020 | Desai | G06K 9/6248 |
| 2020/0151018 A1* | 5/2020 | Jha | G06F 9/4856 |
| 2020/0201665 A1* | 6/2020 | Panse | G06F 9/5077 |
| 2020/0204449 A1* | 6/2020 | Bitterfeld | H04L 41/12 |
| 2020/0241910 A1* | 7/2020 | Verma | G06F 9/5044 |
| 2020/0374113 A1* | 11/2020 | Noam | H04L 9/0847 |

\* cited by examiner

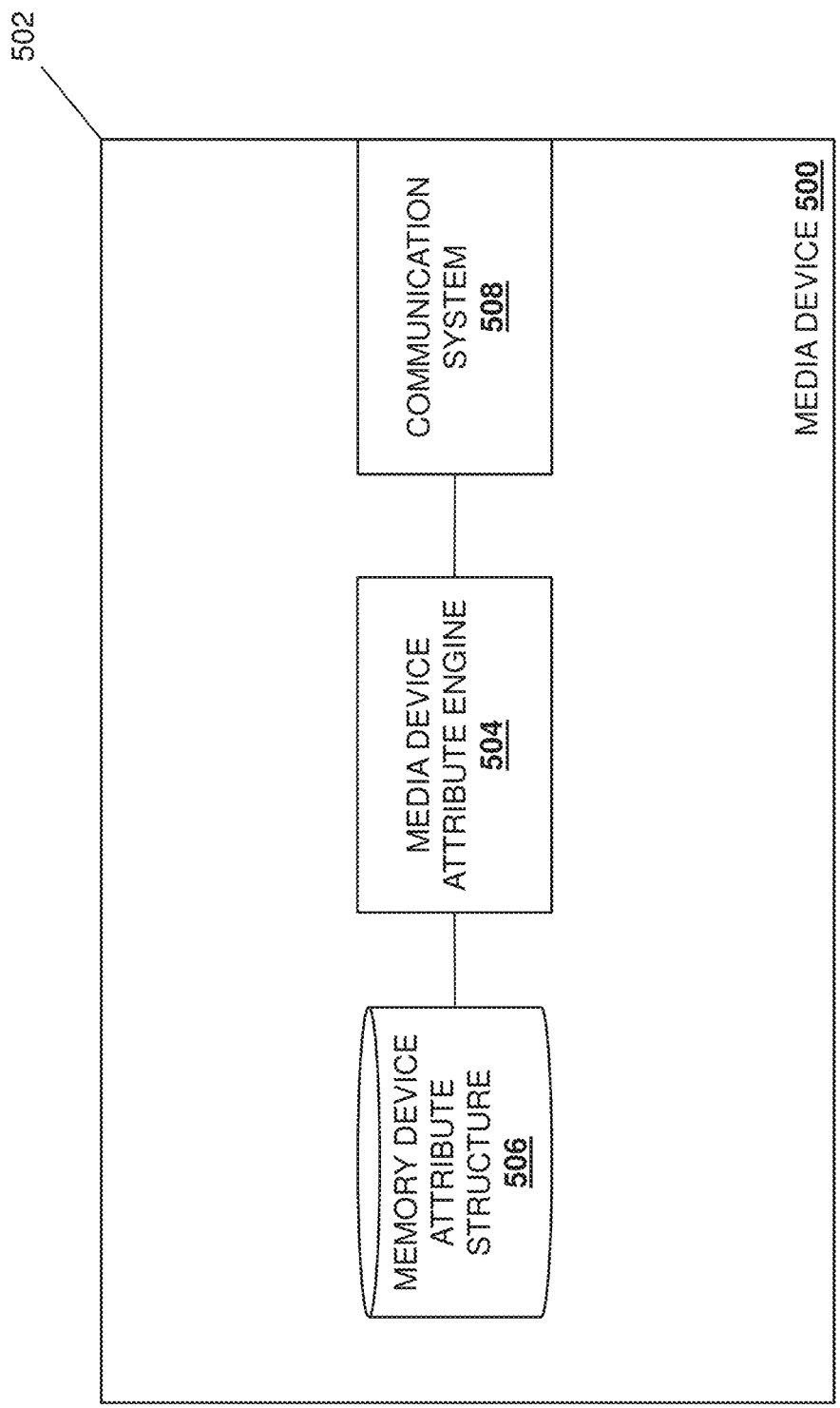

| Byte | Bit Applies To | 7 | 6 | 5 | 4 | 3 | 2 | 1 | 0 |
|---|---|---|---|---|---|---|---|---|---|
| 0 | All | PERIPHERAL QUALIFIER (000b) | | | | PERIPHERAL DEVICE TYPE (00000b) | | | |
| 1 | All | PAGE CODE (DCh) | | | | | | | |
| 2 | All | (MSB) PAGE LENGTH | | | | | | | |
| 3 | All | (11Eh [HDD] or 14Eh [SSD]) (LSB) | | | | | | | |
| 4–11 | All | VENDOR ID (ASCII) | | | | | | | |
| 12–27 | All | PRODUCT ID (ASCII) | | | | | | | |
| 28–31 | All | FIRMWARE REVISION LEVEL (ASCII) | | | | | | | |
| 32–51 | All | PRODUCT SERIAL NUMBER (ASCII) | | | | | | | |
| 52–59 | All | TARGET DEVICE NAME (SAS) | | | | | | | |
| 60–67 | All | TARGET PORT IDENTIFIER 1 (SAS) | | | | | | | |
| 68–75 | All | TARGET PORT IDENTIFIER 2 (SAS) | | | | | | | |
| 76–79 | All | NOMINAL FORM FACTOR WIDTH (ASCII) | | | | | | | |
| 80–83 | All | NOMINAL FORM FACTOR HEIGHT (ASCII) | | | | | | | |
| 84–91 | All | DEVICE ID (ASCII) | | | | | | | |
| 92–99 | HDD | SERVO CODE LEVEL (ASCII) | | | | | | | |
| 100–115 | All | PCBA SERIAL NUMBER (ASCII) | | | | | | | |
| 116–131 | All | PCBA PART NUMBER (ASCII) | | | | | | | |
| 132–147 | HDD | DISK MEDIA VENDOR (ASCII) | | | | | | | |
| 148–163 | HDD | MOTOR SERIAL NUMBER (ASCII) | | | | | | | |
| 164–179 | HDD | FLEX CIRCUIT ASSEMBLY SERIAL NUMBER (ASCII) | | | | | | | |
| 180–195 | HDD | HEAD VENDOR (ASCII) | | | | | | | |
| 196–211 | HDD | HDC REVISION (ASCII) | | | | | | | |

MEDIA DEVICE ATTRIBUTE STRUCTURE 600

FIG. 6A

| Byte | Bit Applies To | 7 | 6 | 5 | 4 | 3 | 2 | 1 | 0 |
|---|---|---|---|---|---|---|---|---|---|
| 212-227 | HDD | ACTUATOR SERIAL NUMBER (ASCII) | | | | | | | |
| 228-243 | HDD | HEAD DISK ASSEMBLY SERIAL NUMBER (ASCII) | | | | | | | |
| 244-247 | All | YEAR OF MANUFACTURE (ASCII) | | | | | | | |
| 248-249 | All | WEEK OF MANUFACTURE (ASCII) | | | | | | | |
| 250-251 | All | DAY OF MANUFACTURE (ASCII) | | | | | | | |
| 252-259 | All | LOCATION OF MANUFACTURE (ASCII) | | | | | | | |
| 260-283 | All | DELL PPID (ASCII) | | | | | | | |
| 284 | All | (MSB) NOMINAL MEDIUM ROTATION RATE | | | | | | | |
| 285 | All | | | | | | | | (LSB) |
| 286 | All | Reserved (00b) | | | SPI | DFD | DAIC | SFD | Res (0b) | SED |
| 287 | All | Reserved (00h) | | | | | | | Airflow Impedance Category |
| 288 | All | Reserved (00h) | | | | | | | |
| 289 | All | SSD SWIMLANE | | | | | | | |
| 290-297 | SDD | LOW-LEVEL F/W CODE REFERENCE (ASCII) | | | | | | | |
| 298-305 | SDD | FLASH SILICON SUPPLIER (ASCII) | | | | | | | |
| 306-321 | SDD | CONTROLLER CHIP NAME & REVISION (ASCII) | | | | | | | |
| 322-337 | SDD | SSD MECHANICAL ASSEMBLY (ASCII) | | | | | | | |
| 338 | ALL | INITIATOR COUNT | | | | | | | |
| 339 | ALL | RESERVED | | | | | | | |
| 340 | ALL | CODING/DECODING SCHEME | | | | | | | |
| 341 | ALL | DISK SCHEDULING POLICY | | | | | | | |
| 342 | ALL | BLOCK SIZE (UNSIGNED INT) | | | | | | | |
| 343-346 | ALL | WORST CASE IOPS (SINGLE PRECISION FP) | | | | | | | |
| 347-350 | ALL | AVERAGE CASE IOPS (SINGLE PRECISION FP) | | | | | | | |

MEDIA DEVICE ATTRIBUTE STRUCTURE 600

FIG. 6B

| Byte | Bit Applies To | 7 | 6 | 5 | 4 | 3 | 2 | 1 | 0 |
|---|---|---|---|---|---|---|---|---|---|
| 351 - 354 | ALL | BEST CASE IOPS (SINGLE PRECISION FP) | | | | | | | |
| 355 - 358 | ALL | WORST CASE THROUGHPUT (SINGLE PRECISION FP) | | | | | | | |
| 359 - 362 | ALL | AVERAGE CASE THROUGHPUT (SINGLE PRECISION FP) | | | | | | | |
| 363 - 366 | ALL | BEST CASE THROUGHPUT (SINGLE PRECISION FP) | | | | | | | |
| 367 - 370 | ALL | WORST CASE LATENCY (SINGLE PRECISION FP) | | | | | | | |
| 371 - 374 | ALL | AVERAGE CASE LATENCY (SINGLE PRECISION FP) | | | | | | | |
| 375 - 378 | ALL | BEST CASE LATENCY (SINGLE PRECISION FP) | | | | | | | |
| 379 | ALL | RESERVED | | | | | | | |
| 380 | ALL | BLOCK SIZE (UNSIGNED INT) | | | | | | | |
| 381 - 382 | ALL | WORST CASE IOPS (SINGLE PRECISION FP) | | | | | | | |
| 383 - 386 | ALL | AVERAGE CASE IOPS (SINGLE PRECISION FP) | | | | | | | |
| 387 - 390 | ALL | BEST CASE IOPS (SINGLE PRECISION FP) | | | | | | | |
| 391 - 394 | ALL | WORST CASE THROUGHPUT (SINGLE PRECISION FP) | | | | | | | |
| 395 - 398 | ALL | AVERAGE CASE THROUGHPUT (SINGLE PRECISION FP) | | | | | | | |
| 399 - 402 | ALL | BEST CASE THROUGHPUT (SINGLE PRECISION FP) | | | | | | | |
| 403 - 406 | ALL | WORST CASE LATENCY (SINGLE PRECISION FP) | | | | | | | |
| 407 - 410 | ALL | AVERAGE CASE LATENCY (SINGLE PRECISION FP) | | | | | | | |
| 411 - 414 | ALL | BEST CASE LATENCY (SINGLE PRECISION FP) | | | | | | | |
| 415 | ALL | RESERVED | | | | | | | |
| 416 | ALL | BLOCK SIZE (UNSIGNED INT) | | | | | | | |
| 417 - 420 | ALL | WORST CASE IOPS (SINGLE PRECISION FP) | | | | | | | |
| 421 - 424 | ALL | AVERAGE CASE IOPS (SINGLE PRECISION FP) | | | | | | | |
| 425 - 428 | ALL | BEST CASE IOPS (SINGLE PRECISION FP) | | | | | | | |
| 429 - 432 | ALL | WORST CASE THROUGHPUT (SINGLE PRECISION FP) | | | | | | | |
| 433 - 436 | ALL | AVERAGE CASE THROUGHPUT (SINGLE PRECISION FP) | | | | | | | |

MEDIA DEVICE ATTRIBUTE STRUCTURE 600

FIG. 6C

| Byte | Bit Applies To | 7 | 6 | 5 | 4 | 3 | 2 | 1 | 0 |
|---|---|---|---|---|---|---|---|---|---|
| 437-440 | ALL | BEST CASE THROUGHPUT (SINGLE PRECISION FP) | | | | | | | |
| 441-444 | ALL | WORST CASE LATENCY (SINGLE PRECISION FP) | | | | | | | |
| 445-448 | ALL | AVERAGE CASE LATENCY (SINGLE PRECISION FP) | | | | | | | |
| 449-452 | ALL | BEST CASE LATENCY (SINGLE PRECISION FP) | | | | | | | |
| 453 | ALL | RESERVED | | | | | | | |
| 454 | ALL | BLOCK SIZE (UNSIGNED INT) | | | | | | | |
| 455-458 | ALL | RESERVED | | | | | | | |
| 459-462 | ALL | RESERVED | | | | | | | |
| 463-466 | ALL | RESERVED | | | | | | | |
| 467-470 | ALL | RESERVED | | | | | | | |
| 471-474 | ALL | RESERVED | | | | | | | |
| 475-478 | ALL | RESERVED | | | | | | | |
| 479-482 | ALL | RESERVED | | | | | | | |
| 483-486 | ALL | RESERVED | | | | | | | |
| 487-490 | ALL | RESERVED | | | | | | | |

MEDIA DEVICE ATTRIBUTE STRUCTURE 600

FIG. 6D

HYPER-CONVERGED INFRASTRUCTURE (HCI) RESOURCE RESERVATION SYSTEM

BACKGROUND

The present disclosure relates generally to information handling systems, and more particularly to reserving resources for workloads provided in information handling systems based on performance capabilities of media module partitions provided in a media module that includes a plurality of media devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided in a Hyper-Converged Infrastructure (HCI) systems that may be provided by a software-defined Information Technology (IT) infrastructure that virtualizes the elements of "hardware-defined" systems using, for example, virtualized computing subsystems (e.g., a hypervisor subsystem), a virtualized Storage Area Network (SAN) (e.g., "software-defined storage"), and virtualized networking (e.g., "software-defined networking") provided on one or more server devices. HCI systems have evolved from conventional discrete, hardware-defined systems that are connected and packaged together to a software-defined environment in which the functional elements are provided via server device(s) and converged via a hypervisor.

In some situations, HCI systems may implement a composable computing architecture (e.g., the Gen-Z composable computing architecture) that includes compute modules that each include various processing systems, media modules that each include one or more memory and/or storage devices, and a switch that provides communications between the compute modules and the media modules. It is often desirable to utilize the shared operating environment provided in HCI systems implementing a composable computing architecture in order to perform multiple workloads, but doing so raises a number of issues.

For example, a media module may include a plurality of storage devices that may be provided by one or more different types of storage devices such as, Hard Disk Drives (HDD), Solid State Drives (SSD), Non-Volatile Memory express (NVMe), Persistent MEMory (PMEM), Storage Class Memory (SCM), or other storage devices that one of skill in the art will recognize exhibit performance variations relative to each other. Furthermore, even storage devices of the same storage device type can exhibit performance variation relative to each other. Such storage performance variations can cause issues due to the fact that HCl systems do not guaranteed media module performance, which tends to result in workloads with storage requirements being provided on dedicated server devices/systems, rather than having those workloads performed/provided using HCl systems implementing a composable computing architecture that also operates to provide other workloads (i.e., because the HCl system cannot guarantee storage reserved to a workload will meet workload performance requirements for that workload. Thus, when aggregated payloads are provided from workload(s) to an HCl storage system (e.g., via the media module), the HCl storage system may drop the session associated with those payloads, fail to perform the payload transaction, and/or operate in some other manners that can results in a failure to satisfy resource requirements/performance for those workloads. As would be appreciated by one of skill in the art in possession of the present disclosure, the inability to guarantee workload performance requirements by HCl systems limits their utilization in situations where the HCl system is fully capable of providing the workload.

Accordingly, it would be desirable to provide an improved workload/resource reservation system.

SUMMARY

According to one embodiment, an Information Handling System (IHS) includes a processing system; and a memory system that is coupled to the processing system and that includes instructions that, when executed by the processing system, cause the processing system to provide a media controller engine that is configured to: retrieve performance attributes from each of a plurality of media devices in a media module; determine one or more media module partitions that are included in the media module and that have been guaranteed a respective performance level, wherein each of the one or more of media module partitions are provided by a subset of the plurality of media devices; determine, for each of the one or more media module partitions, a minimum partition performance for that media module partition based the performance attributes for the subset of the plurality of media devices that provide that media module partition; and provide the minimum partition performance for each of the plurality of media module partitions to a Hyper-Converged Infrastructure (HCl) resource reservation system.

BRIEF DESCRIPTION OF THE DRAWINGS

FIG. 5 is a schematic view illustrating an embodiment of a media device that may be provided in the media module of FIG. 4.

FIG. 6A is a schematic view illustrating an embodiment of a media device attribute structure that may be provided in the media device of FIG. 4.

FIG. 6B is a schematic view illustrating an embodiment of a media device attribute structure that may be provided in the media device of FIG. 4.

FIG. 6C is a schematic view illustrating an embodiment of a media device attribute structure that may be provided in the media device of FIG. 4.

FIG. 6D is a schematic view illustrating an embodiment of a storage device attribute structure that may be provided in the storage device of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
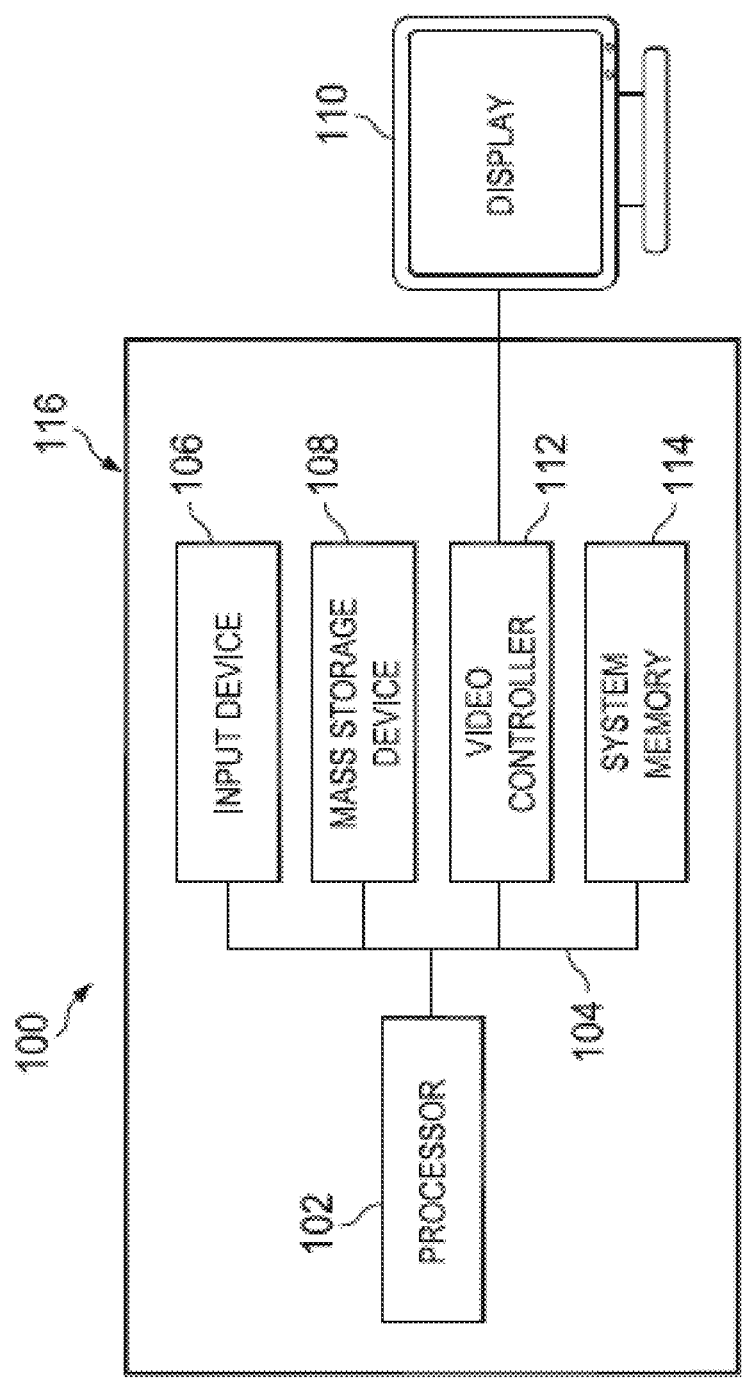
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
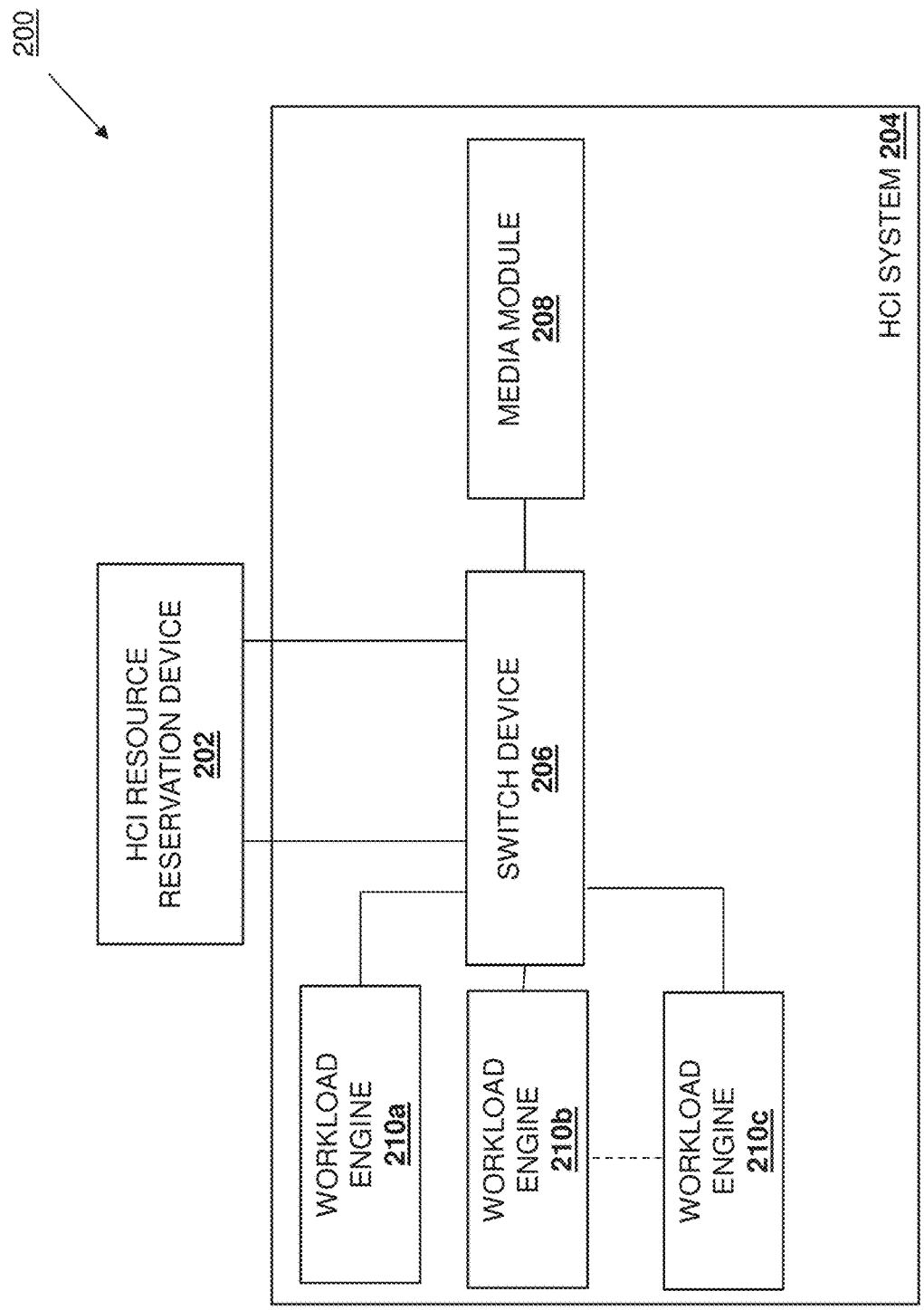
FIG. 2 is a schematic view illustrating an embodiment of a resource reservation system.

Referring now to FIG. 2, an embodiment of a resource reservation system 200 is illustrated. In the illustrated embodiment, the resource reservation system 200 incudes a Hyper-Converged Infrastructure (HCI) resource reservation device 202 that, in the examples below, provides for the reservation of media resources such as storage by, for example, guaranteeing storage performance to workloads in an HCI system. However, one of skill in the art in possession of the present disclosure will recognize that the teachings of the present disclosure may be beneficial to non-HCI systems and other resources besides storage (e.g., memory performance, interconnect performance, compute performance), and thus the application of the teachings of the present disclosure to those situations will fall within the scope of the present disclosure as well. In an embodiment, HCI resource reservation device 202 may be provided by the IHS 100 discussed above with reference to FIG. 1, and/or may include some or all of the components of the IHS 100. For example, one of skill in the art in possession of the present disclosure will recognize that the HCI resource reservation device 202 is described below as a server device. However, while illustrated and discussed as a server device, one of skill in the art in possession of the present disclosure will recognize that the HCI resource reservation device 202 provided in the resource reservation system 200 may include any number of server devices and/or other devices that may be configured to operate similarly as the HCI resource reservation device 202 discussed below.

The HCI resource reservation device 202 is coupled to an HCI system 204. As discussed above, the HCI system 204 may include a software-defined Information Technology (IT) infrastructure that virtualizes the elements of "hardware-defined" systems using, for example, virtualized computing subsystems (e.g., a hypervisor subsystem), a virtualized Storage Area Network (SAN) (e.g., "software-defined storage"), and virtualized networking (e.g., "software-defined networking") provided one or more server devices. As such, the HCI system 204 may be provided by the IHS 100 discussed above with reference to FIG. 1, may include some or all of the components of the IHS 100, and in specific examples is provided by a plurality of server devices.

In the Illustrated embodiment, the HCI system 204 includes a switch device 206 that may be coupled to the HCI resource reservation device 202 (e.g., via a network that may be provided in the resource reservation system 200 by, for example, a Local Area Network (LAN), the Internet, and/or any other network (or combination of networks) that would be apparent to one of skill in the art in possession of the present disclosure.) In an embodiment, the switch device 206 may be provided by the IHS 100 discussed above with reference to FIG. 1, and/or may include some or all of the components of the IHS 100. In a specific example, the switch device 206 may be provided by a Gen-Z switch device. However, while discussed herein as being provided by a switch device, one of skill in the art in possession of the present disclosure will recognize that the switch device 206 may be replaced with a bridge device and/or other devices with similar functionality while remaining within the scope of the present disclosure as well.

Furthermore, the illustrated embodiment of the HCI system 204 includes a media module 208 that is coupled to the switch device 206. In an embodiment, the media module 208 may be provided by the IHS 100 discussed above with reference to FIG. 1, and/or may include some or all of the components of the IHS 100. In specific examples, the media module 208 may be provided by one or more separate server devices, as a logical portion of one or more of the server devices, and/or in a variety of other manners that would be apparent to one of skill in the art in possession of the present disclosure. As will be appreciated by one of skill in the art in possession of the present disclosure, the media module 208 may include one or more media devices such as, for example, memory devices and/or storage devices included in the server device(s) that provide the HCI system 204, and thus may be include storage devices utilized to provide the virtualized Storage Area Network (SAN) (e.g., "software-defined storage") in the HCI system 204, discussed above. In the embodiments discussed below, the media module 208 provides a network-connected media fabric that may be utilized by any processing system in the HCI system 204 via the switch device 206.

For example, the network-connected media fabric may be a Gen-Z media fabric developed and commercialized by the Gen-Z consortium, and which one of skill in the art in possession of the present disclosure will recognize extends the processing system/memory system byte-addressable load/store model to the entire HCI system 204 by decoupling the processing system/compute functionality from the media system/media functionality in the media module 208, allowing processing systems and the media module to act as peers that communicate using the same language via simplified, high performance, low latency communication paths that do not incur the translation penalties and software overhead in conventional systems, thus eliminating bottlenecks and increasing efficiency via the unification of communication paths and simplification of software required for processing system/memory system/storage system communications. However, one of skill in the art in possession of the present disclosure will recognize that other types of media fabrics/composable storage systems will fall within the scope of the present disclosure as well. Furthermore, one of skill in the art in possession of the present disclosure will recognize that in other embodiments the switch device 206 and the media module 208 may be provided in a server device or across a plurality of server devices to enable the functionality described below while remaining within the scope of the present disclosure as well.

In an embodiment, the HCI system 204 may include a processing system (not illustrated, but which may include the processor 102 discussed above with reference to FIG. 1) and a memory system (not illustrated, but which may include the memory 114 discussed above with reference to FIG. 1 or provided by a media module 208) that is coupled to the processing system and that includes instructions that, when executed by the processing system, cause the processing system to provide workload engines 210a, 210b, and up to 210c, each of which is configured to perform the functionality of the workload engines and/or HCI systems discussed below. For example, the processing system may include processors in the server device(s) that provide the HCI system 204, and thus may operate to provide the workload engines 210a-210c that provide the workloads discussed below. In the illustrated embodiment, each of the workload engines 210a-210c may be coupled to the media module 208 via the switch device 206. However, while the workloads are illustrated and described as being provided by workload engines/server devices/processing systems included in the HCI system 204, one of skill in the art in possession of the present disclosure will recognize that workloads may be provided by workload engines/server devices/processing systems that are outside the HCI system 204 (and that are reserved storage at a guaranteed performance from the HCI system 204 as discussed below) while remaining within the scope of the present disclosure as well. While a specific resource reservation system 200 has been illustrated and described, one of skill in the art in possession of the present disclosure will recognize that the system of the present disclosure may include a variety of components and component configurations while remaining within the scope of the present disclosure as well.

Figure 3:
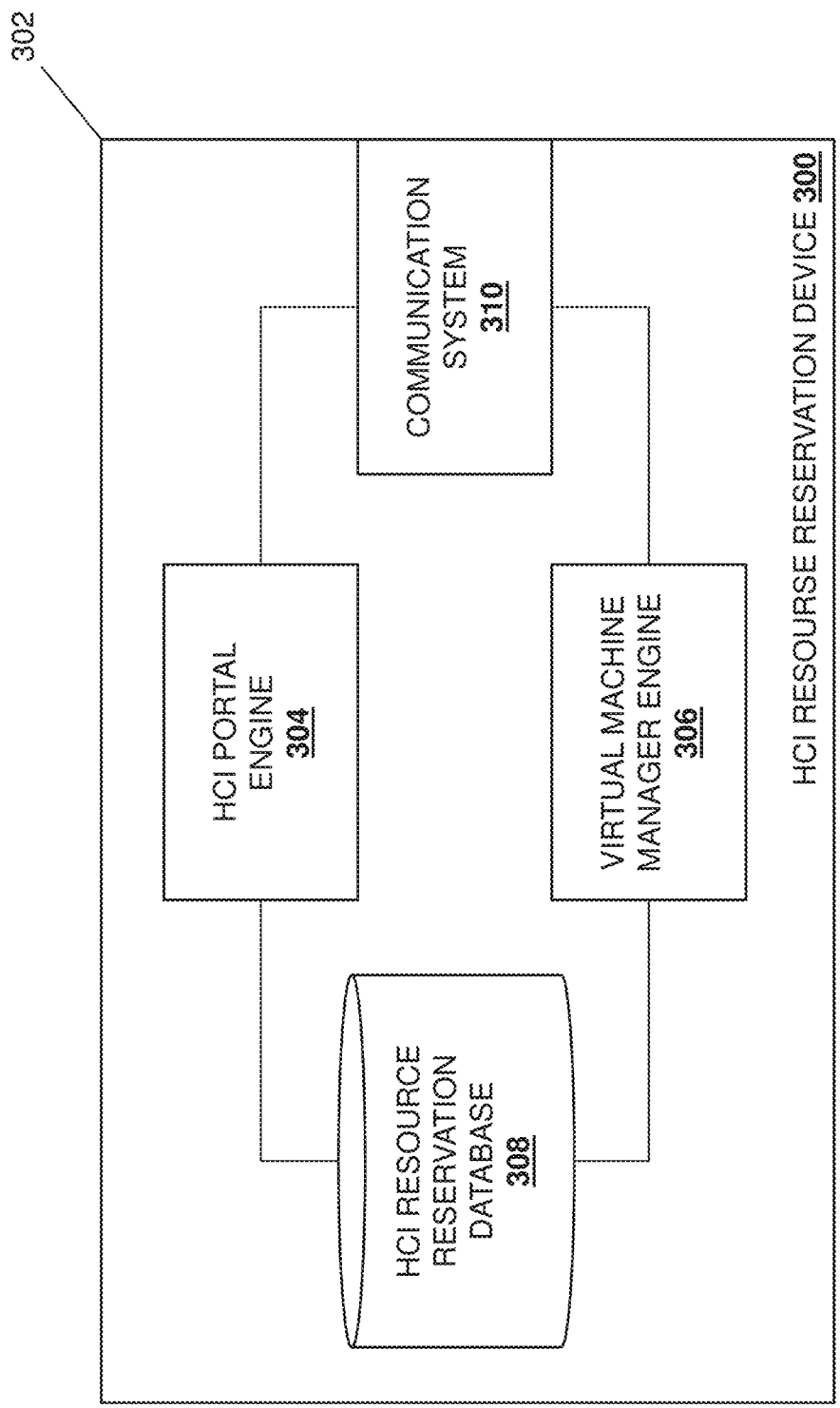
FIG. 3 is a schematic view illustrating an embodiment of an HCl resource reservation device that may be provided in the resource reservation system of FIG. 2.

Referring now to FIG. 3, an embodiment of an HCI resource reservation device 300 is illustrated that may provide the HCI resource reservation device 202 discussed above with reference to FIG. 2. As such, the HCI resource reservation device 300 may be provided by the IHS 100 discussed above with reference to FIG. 1 and/or may include some or all of the components of the IHS 100. Furthermore, while illustrated and discussed as being provided by a server device, one of skill in the art in possession of the present disclosure will recognize that the functionality of the HCI resource reservation device 300 discussed below may be provided by more than one server device, and/or other devices that are configured to operate similarly as the HCI resource reservation device 300 discussed below. In the illustrated embodiment, the HCI resource reservation device 300 includes a chassis 302 that houses the components of the HCI resource reservation device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an HCI portal engine 304 that is configured to perform the functionality of the HCI portal engines and/or HCI resource reservation devices discussed below, as well as a Virtual Machine Manager (VMM) engine 306 that is configured to perform the functionality of the VMM engines and/or HCI resource reservation devices discussed below.

The chassis 302 may also house a storage system (not illustrated, but which may include the storage 108 discussed above with reference to FIG. 1) that is coupled to each of the HCI portal engine 304 and the VMM engine 306 (e.g., via a coupling between the storage system and the processing system) and that includes an HCI resource reservation database 308 that is configured to store any of the information utilized by the HCI portal engine 304 and the VMM engine 306 discussed below. The chassis 302 may also house a communication system 310 that is coupled to each of the HCI portal engine 304 and the VMM engine 306 (e.g., via a coupling between the communication system 310 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific HCI resource reservation device 300 has been illustrated and described, one of skill in the art in possession of the present disclosure will recognize that HCI resource reservation devices (or other devices operating according to the teachings of the present disclosure in a manner similar to that described below for the HCI resource reservation device 300) may include a variety of components and/or component configurations for providing conventional HCI resource reservation device functionality, as well as the functionality discussed below, while remaining within the scope of the present disclosure as well.

Figure 4:
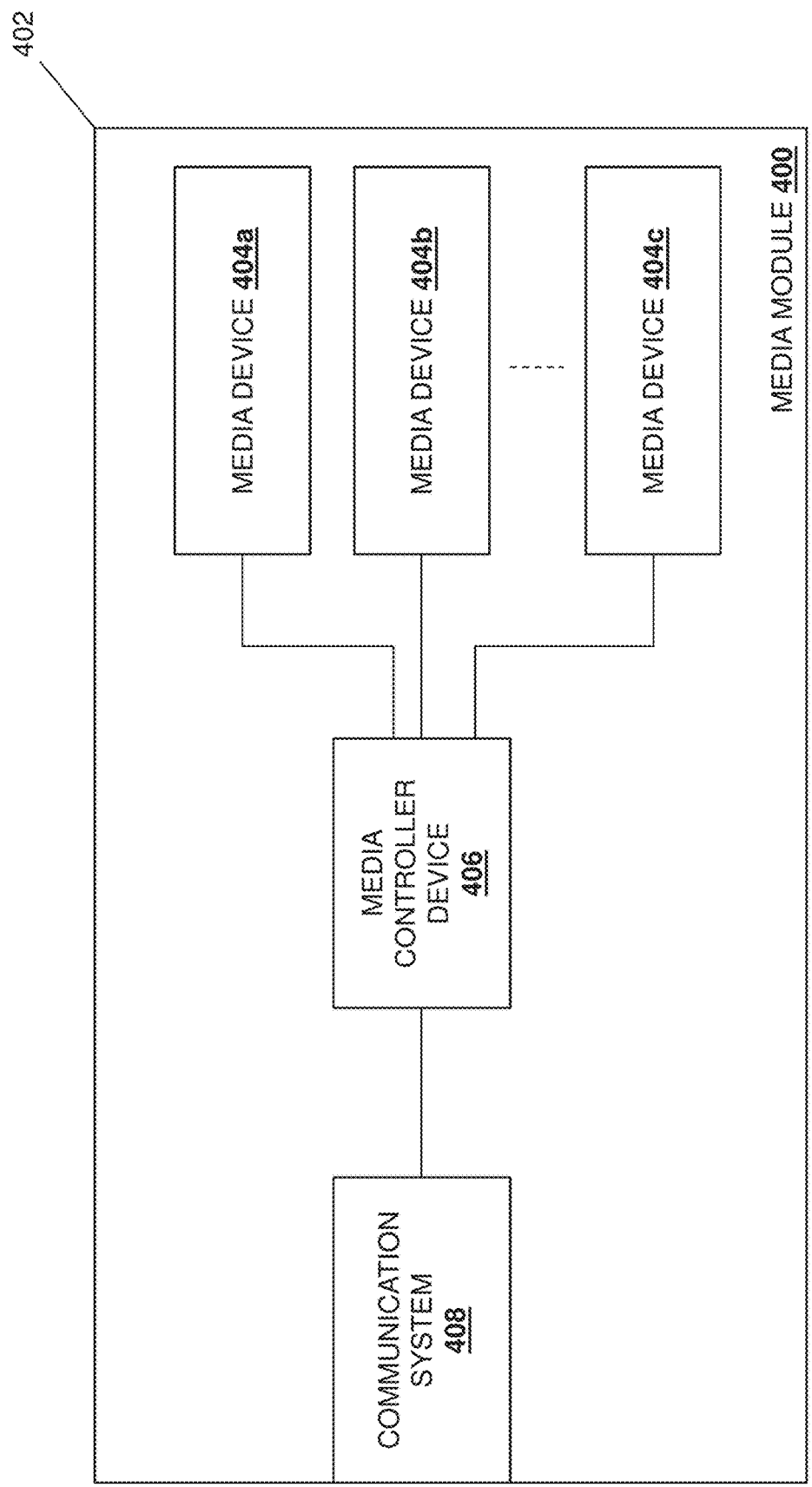
FIG. 4 is a schematic view illustrating an embodiment of media module that may be provided in the resource reservation system of FIG. 2.

Referring now to FIG. 4, an embodiment of a media module 400 is illustrated that may provide the media module 208 discussed above with reference to FIG. 2. As such, the media module 400 may be provided by the IHS 100 discussed above with reference to FIG. 1 and/or may include some or all of the components of the IHS 100, and in specific examples may be provided by one or more separate server devices, logical portion(s) of one or more of the server devices that provide the HCI system 204, and/or in a variety of other manners that would be apparent to one of skill in the art in possession of the present disclosure. Furthermore, while illustrated and discussed as a media module, one of skill in the art in possession of the present disclosure will recognize that the functionality of the media module discussed below may be provided by other devices that are configured to operate similarly as discussed below. In the illustrated embodiment, the media module 400 includes a chassis 402 that houses the components of the media module 400, only some of which are illustrated below.

For example, the chassis 402 may house one or more media devices 404a, 404b, and up to 404c that may be provided by storage devices and/or memory devices such as, for example, Dynamic Random Access Memory (DRAM) devices, Storage Class Memory (SCM) devices, Solid State Drive (SSD) device arrays, Hard Disk Drive (HDD) devices, Persistent MEMory (PMEM) devices, and/or any other media device that would be apparent to one of skill in the art in possession of the present disclosure. In the illustrated embodiment, the chassis 402 houses a media controller device 406 that is coupled to the media devices 404a-404c. While illustrated as a single media controller device 406 coupled to one or more media device(s) 404a-404c, one of skill in the art in possession of the present disclosure will recognize that multiple media controller devices may be provided for the media devices 404a-404c while remaining within the scope of the present disclosure as well. For example, a separate media controller device may be provided for each media device technology (e.g., a first media controller device may be provided for DRAM devices, a second media controller device may be provided for SCM devices, etc.) However, while a few specific examples of media devices and media controller devices have been provided, one of skill in the art in possession of the present disclosure will recognize that a wide variety of media devices, and/or media controller device components and/or configurations will fall within the scope of the present disclosure as well.

In the illustrated embodiment, the chassis 402 houses a communication system 408 that is configured to provide media management operations for the media module 400. For example, when the media module is a Gen-Z media module as discussed above, the communication system 408 may include a Gen-Z Memory Management Unit (Gen-Z ZMMU) that, in the example provided below, operates as a Gen-Z ZMMU responder that operates with Gen-Z ZMMU requester(s) that provide access for the processing systems that provide the workload engines 210a-210c access to the Gen-Z media fabric. However, one of skill in the art in possession of the present disclosure will recognize that other communication systems for other media fabrics may be utilized with the teachings of the present disclosure while remaining within its scope as well. While a specific media module 400 has been illustrated, one of skill in the art in possession of the present disclosure will recognize that media module (or other systems operating according to the teachings of the present disclosure in a manner similar to that described below for the media module 400) may include a variety of components and/or component configurations for providing conventional media module functionality, as well as the functionality discussed below, while remaining within the scope of the present disclosure as well.

Referring now to FIG. 5, an embodiment of a media device 500 is illustrated that may provide any or all of the media devices 404a-404c discussed above with reference to FIG. 4. As such, the media device 500 may be provided in the IHS 100 discussed above with reference to FIG. 1 and/or may provide one of the components of the IHS 100. Furthermore, while illustrated and discussed as a media device, one of skill in the art in possession of the present disclosure will recognize that the functionality of the media device 500 discussed below may be provided by portions of a memory device and/or a memory system, portions of a storage device and/or a storage system, etc. In the illustrated embodiment, the media device 500 includes a chassis 502 that houses the components of the media device 500, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a media device attribute engine 504 that is configured to perform the functionality of the media device attribute engines and/or media devices discussed below. As discussed below, in some examples, the media device attribute engine 504 may be configured to push the media device attributes discussed below to the media controller device 406. However, one of skill in the art in possession of the present disclosure will recognize that such functionality may require a relatively complex processing system and, as such, in other embodiments the media device attribute engine 504 may be omitted, or may be replaced by circuitry or other subsystems that allow the media device attributes to be pulled from the media device 500 in the manner described below.

The chassis 502 may also house a storage subsystem (not illustrated, but which may include a portion of the storage 108 discussed above with reference to FIG. 1) that is coupled to the media device attribute engine 504 (e.g., via a coupling between the storage system and the processing system) and that includes a media device attribute structure 506 that is configured to store media device attributes discussed below. However, as discussed above, in some embodiments the media device attribute engine 504 may be omitted, or may be replaced by circuitry or other subsystems that allow the media device attributes to be pulled from the media device 500 in the manner described below, and thus the media device attribute structure 506 may be coupled to those subsystems/that circuitry as well. The chassis 502 may also house a communication system 508 that is coupled to the media device attribute engine 504 (e.g., via a coupling between the communication system 508 and the processing system) or directly to the media device attribute structure 506, and that may be provided by any media device communication components that would be apparent to one of skill in the art in possession of the present disclosure. While a specific media device 500 has been illustrated, one of skill in the art in possession of the present disclosure will recognize that media devices (or other devices and/or media subsystems operating according to the teachings of the present disclosure in a manner similar to that described below for the media device 500) may include a variety of components and/or component configurations for providing conventional media device functionality, as well as the functionality discussed below, while remaining within the scope of the present disclosure as well.

Referring now to FIGS. 6A, 6B, 6C, and 6D, an embodiment of a media device attribute structure 600 is illustrated that may be the media device attribute structure 506 included in the media device 500 discussed above with reference to FIG. 5. As such, a media device attribute structure similar to the media device attribute structure 600 may be included in each of the media devices 404a-404c illustrated in FIG. 4 (and may include media devices attributes determined for that particular media device as discussed below.) In some embodiments, the manufacturer and/or other provider of the media device 500/404a-404c may utilize the media device attribute structure 600 to provide any of the media device attributes discussed below. For example, any manufacturer and/or other provider of any of the media devices 500/404a-404c may determine media device primitive information about that media device that may include, for example, information about/associated with the basic hardware utilized in that media device, and may include that media device primitive information in the media device attribute structure 600 for that media device. Furthermore, any manufacturer and/or other provider of any of the media device 500/404a-404c may perform a variety of testing on that media device in order to measure and confirm any of a variety of media device performance capability information that describes the performance capabilities of that media device, and may include that media device performance capability information in the media device attribute structure 600 for that media device.

As will be appreciated by one of skill in the art in possession of the present disclosure, the performance capabilities of a media device may change when firmware utilized by the media device is updated. For example, primitive details of basic hardware provided in a media device may provide performance capabilities for a media device, and different firmware versions may change those performance capabilities. As such, for any firmware update for a media device, the media device manufacturers or other media device providers may determine the firmware-updated performance capabilities of any media device utilizing that updated firmware, and may provide a media attribute update in that firmware update that operates to update the media attributes in the media attribute structure in order to identify the firmware-updated performance capabilities of the media device when that media devices utilizes the updated firmware.

In particular, the measurement and confirmation of any media device performance capability information that describes the performance capabilities of a media device may include defining a "worst case" performance capability that is included as worst case performance capability information in the media device attribute structure 600 for that media device and that identifies the minimum performance level of that media device, which as discussed below may be considered the guaranteed performance level for that media device. Furthermore, the measurement and confirmation of any media device performance capability information that describes the performance capabilities of a media device may include defining a "best case" performance capability that is included as best case performance capability information in the media device attribute structure 600 for that media device and that identifies the maximum performance level of that media device, and that may be utilized for oversubscription/allocation of the media resources and/or for use in obtaining the highest Return On Investment (ROI) for the media resources (i.e., allocating those unguaranteed high-performance media resources to workloads that pay the highest price for them.) Further still, the measurement and confirmation of any media device performance capability information that describes the performance capabilities of a media device may include defining an "average case" performance capability that is included as average case performance capability information in the media device attribute structure 600 for that media device and that identifies the performance level of that media device between its minimum performance level and its maximum performance level. However, while a few specific examples have been described, one of skill in the art in possession of the present disclosure will recognize that performance capabilities of a media device may be measured, confirmed, and/or other determined and defined in a variety of manners that will fall within the scope of the present disclosure as well.

As will be appreciated by one of skill in the art in possession of the present disclosure, the example of the media device attribute structure 600 illustrated in FIGS. 6A-6D provides a media device attribute structure that may be utilized by a SAS storage device and thus provides a storage device attribute structure. However, one of skill in the art in possession of the present disclosure will recognize that media device attribute structures for SATA storage devices, NVMe storage devices, and/or other storage devices may utilize different media attributes that will fall within the scope of the present disclosure as well. Furthermore, while common block size configurations are provided in the media device attribute structure 600 illustrated in FIGS. 6A-6D, one of skill in the art in possession of the present disclosure will recognize that a variety of different block size configurations may be provided while remaining within the scope of the present disclosure as well. As can be seen in FIG. 6A, the media device attribute structure 600 includes a variety of media device attributes for the media device in which it is provided (e.g., by the manufacturer or other provider of the media device, as discussed above), including a product identifier provided in bytes 12-27 of the media device attribute structure 600, a nominal form factor height and width provided in bytes 76-79 and bytes 80-83 of the media device attribute structure 600, a motor serial number provided in bytes 148-163 of the media device attribute structure 600 (each of which may be expressed in American Standard Code for Information Interchange (ASCII) in the media device attribute structure 600), as well as a variety of other media device attributes. As can also be seen in FIG. 6B, the media device attribute structure 600 also includes a variety of media device attributes for the media device in which it is provided (e.g., by the manufacturer or other provider of the media device, as discussed above), including details about the date of manufacture of the media device provided in bytes 244-247, 248-249, and 250-251 of the media device attribute structure 600, a flash silicon supplier in bytes 298-305 of the media device attribute structure 600, details about the SSD mechanical assembly provided in bytes 322-337 of the media device attribute structure 600 (each of which may be expressed in ASCII in the media device attribute structure 600), as well as a variety of other media device attributes.

Furthermore, the media device attribute structure 600 includes a variety of performance capability information provided as media device attributes. As will be appreciated by one of skill in the art in possession of the present disclosure, media device performance capability may depend on a block size utilized by the media device, and thus the example below provides media device attributes that identify performance capabilities based on different block sizes utilized for the media device. However, one of skill in the art in possession of the present disclosure will recognize that media device performance capabilities may be expressed in a variety of manners that will fall within the scope of the present disclosure as well. In the example illustrated in FIGS. 6B, 6C, and 6D, a first block size (e.g., a 512 byte block size) is identified at byte 342, and that first block size is associated with performance capability information media device attributes that include a worst/average/ best case Input/output Operations Per Second (IOPS) for the media device at that first block size in bytes 343-346, 347-350, and 351-354 of the media device attribute structure 600, a worst/average/best case throughput for the media device at that first block size in bytes 355-358, 359-362, 363-366 of the media device attribute structure 600, and a worst/average/best case latency for the media device at that first block size in bytes 367-370, 371-374, 375-378 of the media device attribute structure 600, with each of the performance capability information media device attributes in the illustrated embodiment expressed in single precision Floating Point (FP) in the media device attribute structure 600 (although other means for expressing the performance capability information provided as media device attributes will fall within the scope of the present disclosure as well.)

Similarly, a second block size (e.g., a 4000 byte (4 KB) block size) is identified at byte 380, and that second block size is associated with performance capability information media device attributes that include a worst/average/best case Input/output Operations Per Second (IOPS) for the media device at that second block size in bytes 381-382, 383-386, and 387-390 of the media device attribute structure 600, a worst/average/best case throughput for the media device at that second block size in bytes 391-394, 395-398, and 399-402 of the media device attribute structure 600, and a worst/average/best case latency for the media device at that second block size in bytes 403-406, 407-410, and 411-414 of the media device attribute structure 600, with each of the performance capability information media device attribute in the illustrated embodiment expressed in single precision FP in the media device attribute structure 600 (although other means for expressing the performance capability information provided as media device attributes will fall within the scope of the present disclosure as well.)

Similarly, a third block size (e.g., a 8000 byte (8 KB) block size) is identified at byte 416, and that third block size is associated with performance capability information media device attributes that include a worst/average/best case Input/output Operations Per Second (IOPS) for the media device at that third block size in bytes 417-420, 421-424, and 425-428 of the media device attribute structure 600, a worst/average/best case throughput for the media device at that third block size in bytes 429-432, 433-436, and 437-440 of the media device attribute structure 600, and a worst/ average/best case latency for the media device at that third block size in bytes 441-444, 445-448, and 449-452 of the media device attribute structure 600, with each of the performance capability information media device attribute in the illustrated embodiment expressed in single precision FP in the media device attribute structure 600 (although other means for expressing the performance capability information provided as media device attributes will fall within the scope of the present disclosure as well.) One of skill in the art in possession of the present disclosure will recognize that the 8 KB block size example provided above is not common, but may be utilized in the future due to the ever-increasing capacity of media devices.

While several specific examples of a media device attribute structure and media device attributes for a SAS storage device have been described, one of skill in the art in possession of the present disclosure will recognize that any of a variety of performance capability information that describes performance characteristics of the media device may be included in the media device attribute structure 600 while remaining within the scope of the present disclosure as well. As such, it should be understood that media device attribute structures and media device attributes for the SATA storage devices and NVMe storage devices discussed above may be provided in a similar manner while remaining within the scope of the present disclosure as well.

Figure 7:
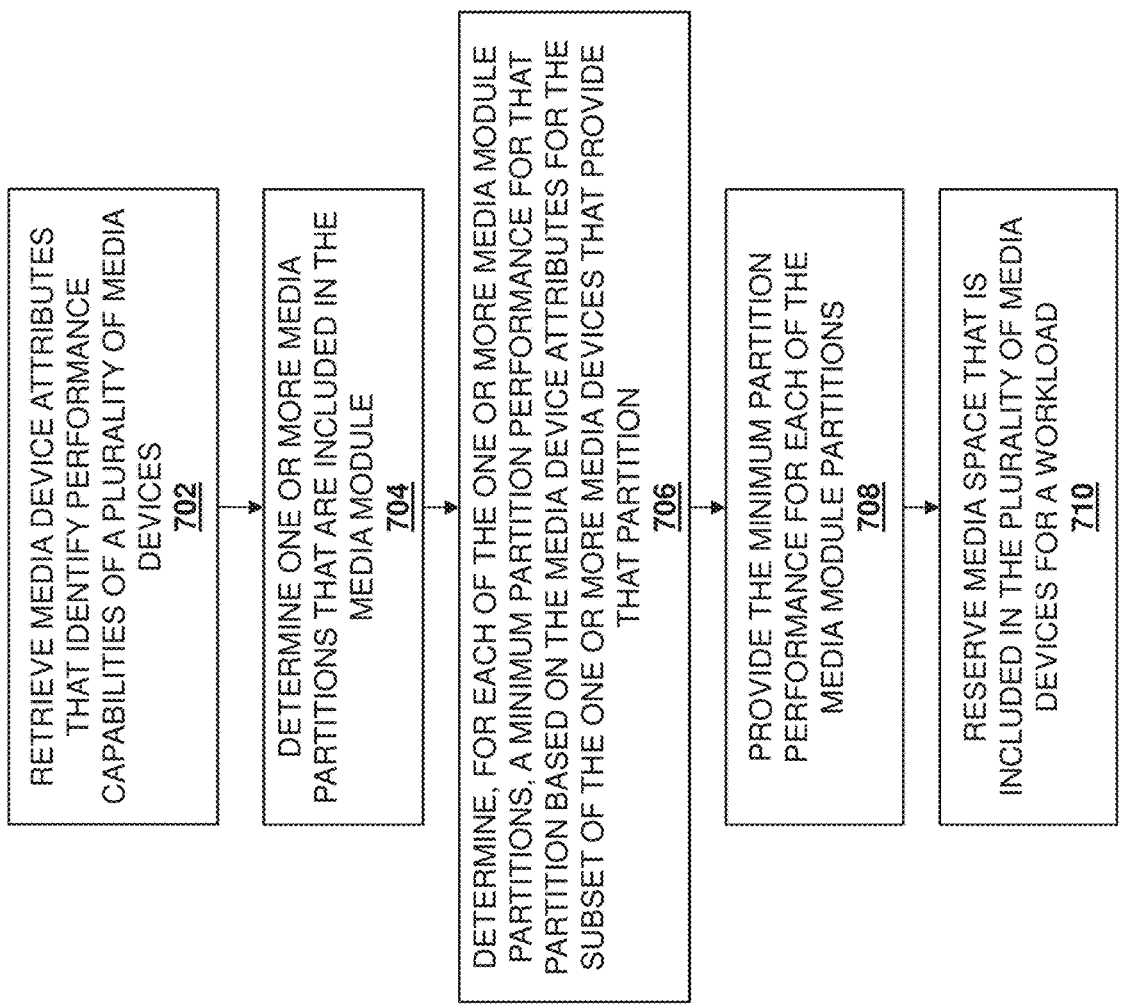
FIG. 7 is a flow chart illustrating an embodiment of a method for providing performance-based resource reservation for workloads.

Referring now to FIG. 7, an embodiment of a method 700 for providing performance-based resource reservation for workloads is illustrated. As discussed below, the systems and methods of the present disclosure provide for the reservation of resources in a media module that includes a plurality of media devices (e.g., storage devices, memory devices) for workloads and in consideration of a guaranteed performance provided by the media devices. For example, a media controller device included in a media module may obtain media device attributes from each of the media devices included in the media module, and may aggregate the media device attributes to determine a guaranteed performance of the media module. The media controller device may then detect partitions that are provided on the media module and that each include at least a subset of the media devices and determine, for each of the media module partitions, a minimum partition performance for that media module partition-based performance attributes for the subset of the one or more media devices that provide that media module partition. The media controller device may then provide the minimum partition performance for each media module partition to a resource reservation device, and the resource reservation device may utilize the minimum partition performance for each of the one or more media module partitions to reserve media space that is included in the plurality of media devices for a workload. As such, an HCl system may reserve media module resources for one or more workloads while ensuring/guaranteeing that those media modules or media module partitions will operate according to minimum performance levels that satisfy performance requirements for the workload.

The method 700 begins at block 702 where a media controller device retrieves media device attributes that identify performance capabilities of a plurality of media devices. In an embodiment, at block 702, the media controller device 406 in the media module 208/400 may operate to retrieve media device attributes from each of the media devices 404*a*, 404*b*, and up to 404*c*. For example, with reference to the embodiment of the resource reservation system 200 illustrated in FIG. 2, the media controller device 406 in the media module 208/400 may access the media devices 404*a*-404*c* and may retrieve any or all of the media device attributes included in the media device structure 506/600 in the media devices 404*a*-404*c*/500 (i.e., via its communication system 508.) However, while the media device attributes are discussed as being retrieved or "pulled" from the media devices 404*a*-404*c*, one of skill in the art in possession of the present disclosure will recognize that the media devices 404*a*-404*c*/500 may include the media device attribute engine 504 discussed above with reference to FIG. 5 that is configured to provide or "push" the media device attributes to the media controller device 406 in the media module 208/400 while remaining within the scope of the present disclosure as well.

As will be appreciated by one of skill in the art in possession of the present disclosure, in some embodiments of block 702, the media controller device 406 in the media module 208/400 may only retrieve particular media device attributes from the media devices 404a-404c. For example, one of skill in the art in possession of the present disclosure will recognize that some of the media device attributes in the media device attribute structure 600 illustrated in FIGS. 6A-6D may not be needed for the reservation of any particular resource, and thus the media controller device 406 may not retrieve those media device attributes from those media devices at block 606. For example, the media controller device 406 may be configured to retrieve performance capability information media device attributes associated with minimum performance capabilities (e.g., guaranteed performance) of the media device such as, for example, worst-case throughput, worst-case IOPS, worst-case latency, and/or any other minimum performance capability information that may be apparent to one of skill in the art in possession of the present disclosure. However, while a particular example has been provided, one of skill in the art in possession of the present disclosure will recognize that different subsets of media device attributes included in a media device attribute structure for media devices may be retrieved for a variety of different use cases that will fall within the scope of the present disclosure as well.

The method 700 then proceeds to block 704 where the media controller device determines one or more media module partitions that are included in the media module and that have been guaranteed a respective performance level. In an embodiment, at block 704, the media controller device 406 in the media module 208/400 may operate to determine the media module partitions included in the media module 208/400. For example, the media module 208/400 may be partitioned into one or more partitions, and each partition may have been guaranteed a respective performance level and may be provided by a subset of the media devices 404a-404c. In a specific example, if the media module 208/400 includes one media module partition, that media module partition may include media devices 404a-404c. However, if the media module 208/400 includes two media module partitions, one media module partition may include the media devices 404a and 404b, while the other media module partition may include media device 404c. In yet other examples, portions of each media device 404a, 404b, and up to 404c may be included in a media module partition. However, while particular examples of the partitioning the media module 208/400 and its media device 404a-404c have been provided, one of skill in the art in possession of the present disclosure will recognize that the media module 208/400 and its media device 404a-404c may be partitioned in a variety of ways that will fall within the scope of the present disclosure.

The method 700 then proceeds to block 706 where the media controller device determines, for each of the one or more media module partitions, a minimum partition performance for that media module partition based the performance capabilities identified by the media device attributes for the subset of the one or more media devices that provide that media module partition. In an embodiment, at block 706, the media controller device 406 in the media module 208/400 may operate to use the media device attributes that identify performance capabilities of a plurality of media devices gathered in block 702 of method 700, and the one or more media module partitions that are included in the media module 208/400 determined in block 704 of method 700, to determine a minimum partition performance for each media module partition. For example, when the media devices 404a-404c are storage devices, the media device attributes from the media device attribute structure 600 may include storage device attributes such as worst-case throughput and IOPS. To calculate a minimum throughput for a media module 208/400 that includes no media module partition (i.e., effectively one media module partition because the entire media module 208/400 may be the media module partition), the media controller device 406 may aggregate the worst-case/minimum throughput for each storage device in the media module 208/400. In another example, the media controller device 406 may also determine a channel throughput for the lane between the switch device 206 and the media module 208/400. in a specific example, a single partition throughput included in the media module 208/400 may be the lesser of the aggregated minimum throughput for the media device 404a-404c, and the channel throughput for the lane between the switch device 206 and the media module 208/400.

In a situation where there is more than one media module partition included in the media module 208/400, the media controller device 406 may use the single partition throughput, the total number of media devices 404a-404c included in the media module 208/400, a media device count for the media module partition and, in some embodiments, a priority factor, in order to determine the throughput for a particular media module partition. For example, a partition throughput may be defined by the equation:

$$\text{Partition Throughput}=(SPT*PDC)/TND$$

With SPT representing the single partition throughput, PDC representing the partition device count (e.g., number of media devices included in the media module partition), and TND represent the total number of devices (e.g., number of media devices in media module 208/400.)

If a priority exists for the media module partitions, then the equation above may be modified to provide the equation:

$$\text{Partition Throughput}=(SPT*PDC*PF)/TND$$

With PF representing the priority factor, which may be a factor that is less than or equal to 1,as the entire media module 208/400 may have an aggregated priority factor of 1.

With respect to calculating a minimum IOPS for a media module 208/400 that includes one media module partition, the media controller device 406 may aggregate the worst-case/minimum IOPS for each media device 404a-404c in the media module 208/400. Furthermore, the media controller device 406 may determine a channel throughput for the lane between the switch device 206 and the media module 208/400. In a specific example, a single partition IOPS for a single media module partition included in the media module 208/400 may be the aggregated minimum IOPS for the media devices. However, if the aggregated minimum throughput is greater than the channel throughput for the lane between the switch device 206 and the media module 208/400, then the single partition IOPS for the media module 208/400 may be defined by the equation:

$$\text{Single Partition IOPS}=(CT/AMMT)*AMI$$

With CT representing the channel throughput, AMMT representing the aggregated media module throughput, and AMI representing the aggregated minimum IOPS.

In the situation where there is more than one media module partition included in the media module 208/400, the media controller device 406 may use the single partition IOPS, the total number of media devices 404a-404c included in the media module 208/400, a media device count for the partition and, in some embodiments, a priority factor to determine the partition IOPS for each partition. For example, a partition IOPS may be defined by the equation:

$$\text{Partition IOPS}=(SPI*PDC)/TND$$

With SPI representing the single partition IOPS, PDC representing the partition device count (e.g., number of media devices in partition), and TND represent the total number of devices (e.g., number of media devices in media module 208/400). As will be appreciated by one of skill in the art in possession of the present disclosure, this algorithm may be performed for each partition.

If a priority exists for the media module partitions included in the media module 208/400, then the equation above for partition IOPS may be modified to provide the equation:

$$\text{Partition IOPS}=(SPI*PDC*PF)/TND$$

With PF representing the priority factor. While specific examples of algorithms have been described that may be utilized to calculate media module partition performance with respect to throughput and IOPS, one of skill in the art in possession of the present disclosure will recognize that similar algorithms may be used to calculate other minimum performance levels based on other media device attributes of the media module 208/400, or to calculate the partition IOPS or the partition throughput, without departing from the scope of the present disclosure.

The method 700 then proceeds to block 708 where the media controller device provides the minimum partition performance for each of the one or more media module partitions to the resource reservation device. In an embodiment, at block 708, the media controller device 406 may provide the minimum partition performance for each of the one or more media module partitions to the HCl resource reservation device 202 via the switch device 206. For example, the media controller device 406 may push the minimum partition performance for each of the one or more media module partitions to the HCl resource reservation device 202. However, in other examples, the media controller device 406 may log the minimum partition performance for each of the one or more media module partitions, and the HCl resource reservation device 202 may retrieve the log of the minimum partition performance for each of the one or more media module partitions via the switch device 206.

The method 700 may proceed to block 710 where, based on the minimum partition performance for each of the one or more media module partitions, the resource reservation device reserves media space that is included in the plurality of media devices for a workload. In an embodiment, at block 710, the HCl portal engine 304 and/or the VMM engine 306 in the HCl resource reservation device 202/300 may operate to determine that at least one of the plurality of media module partitions included in the media module 208/400 includes minimum partition performance capabilities that satisfy the workload performance requirements of a workload that may be provided on the workload engines 212a, 212b, and/or 212c. The HCl resource reservation device 202 may then reserve media space in a media module partition included in the media module 208/400 for the workload when that media module partition includes minimum partition performance capabilities that satisfy the workload performance requirements for that workload.

Figure 8:
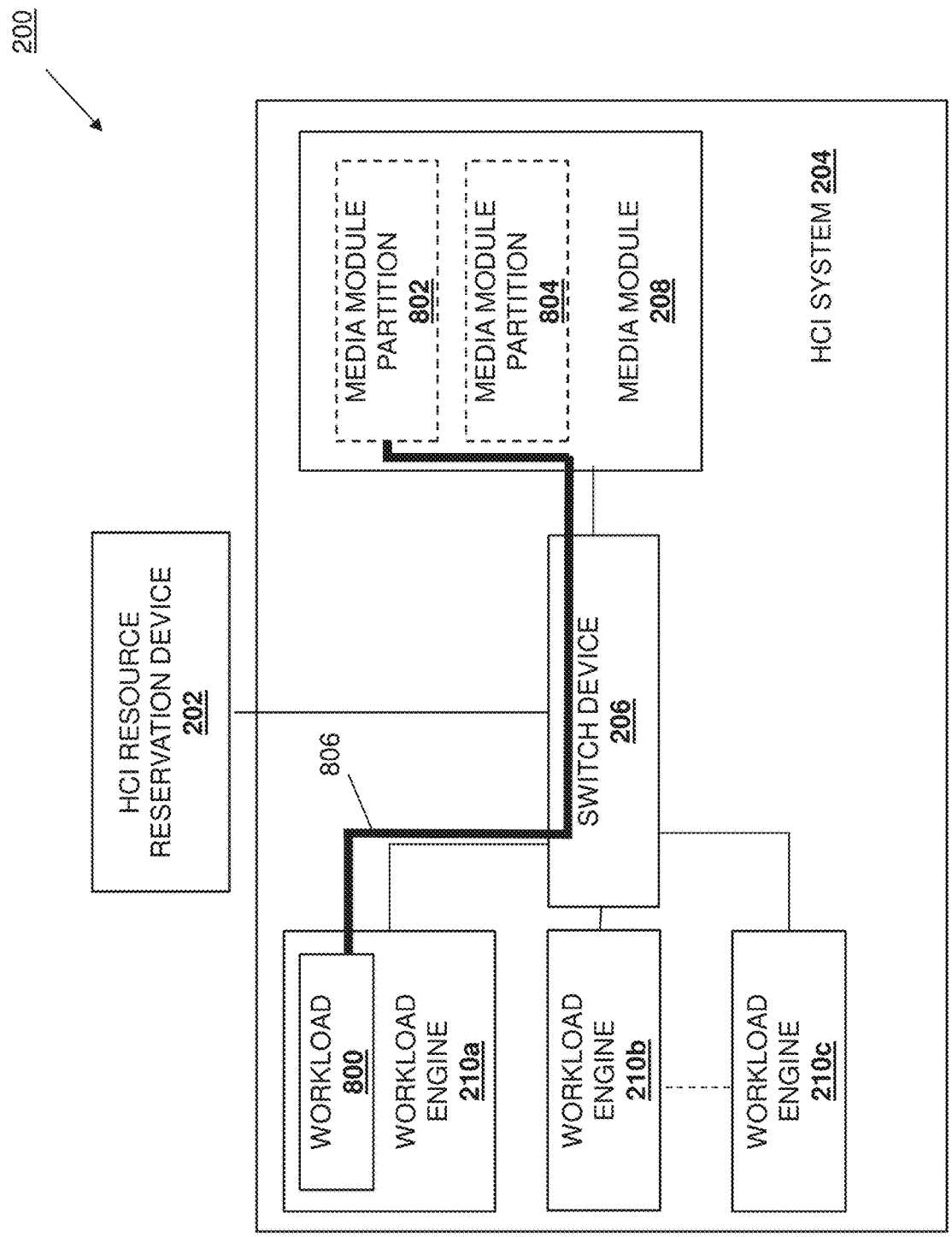
FIG. 8 is a schematic view illustrating an embodiment of the resource reservation system of FIG. 2 operating during the method of FIG. 7.

As illustrated in FIG. 8, the workload engine 212a may operate to provide a workload 800 that requires storage resources and, in response, the HCl resource reservation device 202 may identify that workload 800. The HCl resource reservation device 202 may then determine that the workload 800 has a minimum workload performance requirement that requires a minimum storage performance (e.g., a minimum throughput, a minimum IOPS), and may reference the minimum partition performance capabilities of each of the media module partitions that are included in the media module 208/400. For example, a media module partition 802 and a media module partition 804 may be included in the media module 208/400, and the HCl resource reservation device 202 may determine that the minimum partition performance capabilities of media module partition 802 satisfy the workload performance requirement for the workload 800, while the minimum partition capabilities of the media module partition 804 do not satisfy the minimum workload performance requirement for the workload 800. Thus, at block 710, the HCl resource reservation device 202 may reserve resources (e.g., storage space) on storage devices included in the media module partition 804 for the workload 800, as indicated by the link 806.

As will be appreciated by one of skill in the art in possession of the present disclosure, the determination by the HCl resource reservation device 202 that any of the one or more of media module partitions includes minimum partition performance capabilities that satisfy at least one workload requirement of a workload may include the HCl resource reservation device 202 considering any minimum partition performance capability of media module partitions included in the media module 208/400. For example, the HCl resource reservation device 202 may consider minimum IOPS, minimum throughput, or minimum latency performance capabilities for each media module partition included in the media module 208/400 in order to determine whether that media module partition satisfies performance requirements for a workload. In another example, the HCl resource reservation device 202 may consider each of minimum IOPS, minimum throughput, and minimum latency performance capabilities for each media module partition included in the media module 208/400 in order to determine whether that media module partition satisfies workload performance requirements for a workload. In yet another example, the HCl resource reservation device 202 may consider any combination of minimum IOPS, minimum throughput, or minimum latency performance capabilities for each media module partition included in the media module 208/400 in order to determine whether that media module partition satisfies performance requirements for a workload. However, while several specific examples have been described, one of skill in the art in possession of the present disclosure will recognize that any of a variety of performance capabilities (including those other than IOPS, throughput, and latency, or those other than worst-case IOPS, worst-case throughput, and worst-case latency) may be considered in any combination to determine whether a media module partition included in a media module satisfies workload performance requirements for a workload while remaining within the scope of the present disclosure as well.

Furthermore, while a single media module is illustrated and described as being determined to have minimum partition performance capabilities that satisfy workload performance requirements for the workload, one of skill in the art in possession of the present disclosure will recognize that multiple media modules, multiple partitions included in media module(s), and/or any other combinations of media resources provided by one or more media devices may be determined to have performance capabilities that satisfy workload performance requirements for a workload while remaining within the scope of the present disclosure as well.

In various embodiments of method 700, the media controller device 406 may determine whether any of the one or more media module partitions has changed. For example, he media controller device 406 may detect a change associated with the plurality of media module partitions that are included in the media module 208/400 (e.g., the number of media module partitions included in the media module 208/400 may change, priorities of the media module partitions included in the media module 208/400 may change, the number of media devices 404a-404c included in the media module 208/400 may change, the number of media devices 404a-404c included in a media module partition may change, etc.) If any of the one or more media module partitions has changed, the media controller device 406 may update the minimum partition performance for each of the one or more of media module partitions based on the change associated with the one or more media module partitions that are included in the media module. As such, the media controller device 406 may determine a minimum partition performance for each partition based the performance attributes for the subset of the one or more media devices that provide that media module partition according to block 706 of the method 700, discussed above.

Thus, systems and methods have been described that provide for performance-based resource reservation for workloads by reserving media space provided by media devices included in a media module partition that is included in a media module having a plurality of media devices. A media controller device included in the media module may obtain media device attributes from each of the media devices included in the media module, and may aggregate the media device attributes to determine a guaranteed performance of the media module. The media controller device may then detect partitions provided on the media module that each include at least a subset of the media devices and, for each of the media module partitions, may determine a minimum partition performance for that media module partition based the performance attributes for the subset of the one or more media devices that provide that media module partition. The media controller device may then provide the minimum partition performance for each media module partition to a resource reservation device and, based on the minimum partition performance for each of the one or more media module partitions, the resource reservation device may reserve media space that is included in the plurality of media devices for a workload if the minimum partition performance of a media module partition satisfies a workload performance requirement for the workload. As such, multiple workloads may be allocated media space from an HCI system while ensuring/guaranteeing that those workloads will operate according to minimum/absolute performance levels, rather than requiring a dedicated media module for workloads that require guaranteed media performance.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A resource reservation system, comprising:
a resource reservation device;
a processing system;
a switch device that is coupled to the processing system and the resource reservation device; and
a data storage module that is coupled to the switch device that includes:
a plurality of data storage devices; and
a data storage controller that is coupled to the plurality of data storage devices, wherein the data storage controller is configured to:
retrieve data storage device attributes from each of the plurality of data storage devices that identify data storage performance capabilities for each of the plurality of data storage devices and that include at least a first data storage device attribute and a second data storage device attribute, wherein the first data storage device attribute is based at least on:
a channel throughput for at least one connection between the switch device and at least one of the plurality of data storage devices;
an aggregated throughput of the plurality of data storage devices; and
an aggregated minimum Input/Output Operations Per Second (IOPS) for the plurality of data storage devices;
determine a plurality of data storage partitions that are each provided by a subset of the plurality of data storage devices, wherein the second data storage device attribute is based at least on:
a throughput of at least one of the plurality of data storage partitions;
a number of the plurality of data storage partitions; and
a priority for each of the plurality of data storage partitions;
determine, for each of the plurality of data storage partitions, a minimum data storage partition performance for that data storage partition based the data storage device attributes for the subset of the plurality of data storage devices that provide that data storage partition; and
identify, to the resource reservation device, the minimum data storage partition performance for each of the plurality of data storage partitions,
wherein the resource reservation device is configured to:
identify a plurality of workloads that will be performed by the processing system; and
reserve, for each of the plurality of workloads based on the minimum data storage partition performance for each of the plurality of data storage partitions, data storage space that is included in at least one of the plurality of data storage partitions and that satisfies workload performance requirements for that workload, and
wherein the processing system is configured to:
perform a first workload that utilizes first data storage space that was reserved based on a first minimum data storage partition performance for a first data storage partition satisfying a first workload performance requirement for the first workload; and
perform a second workload that utilizes second data storage space that was reserved based on a second minimum data storage partition performance for a second data storage partition satisfying a second workload performance requirement for the second workload.

2. The system of claim 1, wherein the processing system is configured to:
perform the first workload that utilizes:
the first data storage space that was reserved based on the first minimum data storage partition performance for the first data storage partition satisfying the first workload performance requirement for the first workload; and
third media space that was reserved based on a third minimum data storage partition performance for a third data storage partition satisfying the first workload performance requirement for the first workload.

3. The system of claim 1, wherein the plurality of data storage devices are each provided one of: a storage device or a memory device.

4. The system of claim 1, wherein the data storage controller is configured to:
detect a change associated with the plurality of data storage partitions that are included in the data storage module; and
update, based on the change associated with at least one of the plurality of data storage partitions that are included in the data storage module, the minimum data storage partition performance for each of the at least one of the plurality of data storage partitions.

5. The system of claim 1, wherein the data storage device attributes further include a data storage latency attribute.

6. The system of claim 1, wherein the plurality of data storage devices are each provided one of a Hard Disk Drive (HDD) storage device, a Solid State Drive (SSD) storage device, a Non-Volatile Memory express (NVMe) storage device, a persistent MEMory (PMEM) storage device, and a Storage Class Memory (SCM) storage device.

7. The system of claim 1, wherein the data storage device attributes used to determine the minimum data storage partition performance for each of the plurality of data storage partitions further include worst case data storage device attributes for each of the plurality of data storage devices.

8. An Information Handling System (IHS), comprising:
a Hyper-Converged Infrastructure (HCI) system including:
at least one HCI processing system; and
at least one HCI memory system that is coupled to the at least one HCI processing system and that includes instructions that, when executed by the at least one HCI processing system, cause the at least one HCI processing system to run a data storage controller engine that is configured to:
retrieve data storage device performance attributes from each of a plurality of data storage devices in a data storage module, wherein the data storage device performance attributes include at least a first data storage device performance attribute and a second data storage device performance attribute, wherein the first data storage device performance attribute is based at least on:
a channel throughput for at least one connection between a switch device and at least one of the plurality of data storage devices;
an aggregated throughput of the plurality of data storage devices; and
an aggregated minimum Input/Output Operations Per Second (IOPS) for the plurality of data storage devices;

determine a plurality of data storage partitions that are each provided by a subset of the plurality of data storage devices, wherein the second data storage device performance attribute is based at least on:
a throughput of at least one of the plurality of data storage partitions;
a number of the plurality of data storage partitions; and
a priority for each of the plurality of data storage partitions;
determine, for each of the plurality of data storage partitions, a minimum data storage partition performance for that data storage partition based the data storage performance attributes for the subset of the plurality of data storage devices that provide that data storage partition; and
identify the minimum data storage partition performance for each of the plurality of data storage partitions to a Hyper-Converged Infrastructure (HCI) resource reservation system; and
the HCI resource reservation system including:
at least one HCI resource reservation processing system; and
at least one HCI resource reservation memory system that is coupled to the at least one HCI resource reservation processing system and that includes instructions that, when executed by the at least one HCI resource reservation processing system, cause the at least one HCI resource reservation processing system to run an HCI resource reservation engine that is configured to:
identify a plurality of workloads that will be performed by the HCI system; and
reserve, for each of the plurality of workloads based on the minimum data storage partition performance for each of the plurality of data storage partitions, data storage space that is included in at least one of the plurality of data storage partitions that satisfies workload performance requirements for that workload,
wherein the at least one HCI memory system includes instructions that, when executed by the at least one HCI processing system, cause the at least one HCI processing system to run a plurality of workload engines that are configured to:
perform a first workload that utilizes first data storage space that was reserved based on a first minimum data storage partition performance for a first data storage partition satisfying a first workload performance requirement for the first workload; and
perform a second workload that utilizes second data storage space that was reserved based on a second minimum data storage partition performance for a second data storage partition satisfying a second workload performance requirement for the second workload.

9. The IHS of claim 8, wherein the plurality of workload engines that are configured to:
perform the first workload that utilizes:
the first data storage space that was reserved based on the first minimum data storage partition performance for the first data storage partition satisfying the first workload performance requirement for the first workload; and third media space that was reserved based on a third minimum data storage partition performance for a third data storage partition satisfying the first workload performance requirement for the first workload.

10. The IHS of claim 8, wherein the plurality of data storage devices are each provided one of: a storage device or a memory device.

11. The IHS of claim 8, wherein the data storage controller engine is configured to:
 detect a change associated with the plurality of data storage partitions that are included in the data storage module; and
 update, based on the change associated with at least one of the plurality of data storage partitions that are included in the data storage module, the minimum data storage partition performance for each of the plurality of data storage partitions.

12. The IHS of claim 8, wherein the data storage performance attributes further include a data storage latency attribute.

13. The IHS of claim 8, wherein the plurality of data storage devices are each provided one of a Hard Disk Drive (HDD) storage device, a Solid State Drive (SSD) storage device, a Non-Volatile Memory express (NVMe) storage device, a persistent MEMory (PMEM) storage device, and a Storage Class Memory (SCM) storage device.

14. The IHS of claim 8, wherein the data storage performance attributes used to determine the minimum data storage partition performance for each of the plurality of data storage partitions further include worst case data storage performance attributes for each of the plurality of data storage devices.

15. A method of performance-based resource reservation for workloads, comprising:
 retrieving, by a data storage controller device included in a data storage module, data storage performance attributes from each of a plurality of data storage devices in the data storage module, wherein the data storage device performance attributes include at least a first data storage device performance attribute and a second data storage device performance attribute, wherein the first data storage device performance attribute is based at least on:
  a channel throughput for at least one connection between a switch device and at least one of the plurality of data storage devices;
  an aggregated throughput of the plurality of data storage devices; and
  an aggregated minimum Input/Output Operations Per Second (IOPS) for the plurality of data storage devices;
 determining, by the data storage controller device, a plurality of data storage partitions that are each provided by a subset of the plurality of data storage devices, wherein the second data storage device performance attribute is based at least on:
  a throughput of at least one of the plurality of data storage partitions;
  a number of the plurality of data storage partitions; and
  a priority for each of the plurality of data storage partitions;
 determining, by the data storage controller device for each of the plurality of data storage partitions, a minimum data storage partition performance for that data storage partition based the data storage performance attributes for the subset of the plurality of data storage devices that include that data storage partition;
 identifying, by the data storage controller device, the minimum data storage partition performance for each of the plurality of data storage partitions to a Hyper-Converged Infrastructure (HCI) resource reservation system;
 identifying, by the HCI resource reservation system, a plurality of workloads that will be performed by a processing system;
 reserving, by the HCI resource reservation system for each the plurality of workloads based on the minimum data storage partition performance for each of the plurality of data storage partitions, data storage space that is included in at least one of the plurality of data storage partitions that satisfies workload performance requirements for that workload;
 performing, by the processing system, a first workload that utilizes first data storage space that was reserved based on a first minimum data storage partition performance for a first data storage partition satisfying a first workload performance requirement for the first workload; and
 performing, by the processing system, a second workload that utilizes second data storage space that was reserved based on a second minimum data storage partition performance for a second data storage partition satisfying a second workload performance requirement for the second workload.

16. The method of claim 15, further comprising:
 performing, by the processing system, the first workload that utilizes:
  the first data storage space that was reserved based on the first minimum data storage partition performance for the first data storage partition satisfying the first workload performance requirement for the first workload; and
  the third data storage space that was reserved based on a third minimum data storage partition performance for a third data storage partition satisfying the first workload performance requirement for the first workload.

17. The method of claim 15, further comprising:
 storing, by the data storage controller device, a log that includes the minimum data storage partition performance for each of the plurality of data storage partitions.

18. The method of claim 15, further comprising:
 detecting, by the data storage controller device, a change associated with the plurality of data storage partitions that are included in the data storage module; and
 updating, by the data storage controller device based on the change associated with at least one of the plurality of data storage partitions that are included in the data storage module, the minimum data storage partition performance for each of the at least one of the plurality of data storage partitions.

19. The method of claim 15, wherein the plurality of data storage devices are each provided one of a Hard Disk Drive (HDD) storage device, a Solid State Drive (SSD) storage device, a Non-Volatile Memory express (NVMe) storage device, a persistent MEMory (PMEM) storage device, and a Storage Class Memory (SCM) storage device.

20. The method of claim 15, wherein the performance attributes used to determine the minimum data storage partition performance for each of the plurality of data storage partitions further include worst case data storage performance attributes for each of the plurality of data storage devices.

\* \* \* \* \*